(12) United States Patent
Souther et al.

(10) Patent No.: US 7,786,028 B2
(45) Date of Patent: Aug. 31, 2010

(54) NONWOVEN POLYMERIC FIBER MAT COMPOSITES AND METHOD

(75) Inventors: Roger Lee Souther, Woodruff, SC (US); Ralph Michael Fay, Lakewood, CO (US); Ruben Gregory Garcia, Littleton, CO (US)

(73) Assignee: Johns Manville, Denver, CO (US)

( * ) Notice: Subject to any disclaimer, the term of this patent is extended or adjusted under 35 U.S.C. 154(b) by 1181 days.

(21) Appl. No.: 11/376,538

(22) Filed: Mar. 15, 2006

(65) Prior Publication Data

US 2006/0228963 A1 Oct. 12, 2006

Related U.S. Application Data

(63) Continuation-in-part of application No. 11/102,897, filed on Apr. 8, 2005.

(51) Int. Cl.
*B32B 27/04* (2006.01)
*B32B 5/18* (2006.01)
*D04H 1/00* (2006.01)
*D02G 3/00* (2006.01)

(52) U.S. Cl. .................. 442/85; 442/361; 442/374; 442/387; 428/373

(58) Field of Classification Search ................ 442/361, 442/374, 381, 386, 387, 394, 60, 64, 85, 442/170, 164

See application file for complete search history.

(56) References Cited

U.S. PATENT DOCUMENTS

| | | | | |
|---|---|---|---|---|
| 3,670,506 A * | 6/1972 | Gaudard | ............... | 405/302.7 |
| 4,935,295 A * | 6/1990 | Serafini | ............... | 442/383 |
| 2004/0148887 A1* | 8/2004 | Di Pede | ............... | 52/408 |
| 2004/0214489 A1* | 10/2004 | Porter | ............... | 442/36 |
| 2005/0241745 A1* | 11/2005 | Bansal | ............... | 156/167 |

* cited by examiner

*Primary Examiner*—Lynda Salvatore
(74) *Attorney, Agent, or Firm*—Robert D. Touslee

(57) ABSTRACT

A flexible nonwoven mat of polymeric fibers is liquid water transmission resistant and is particularly well suited for use as a prefabricated building construction underlayment. The polymeric fibers may be standard polymeric fibers or sheathed polymeric fibers that have fiber sheaths with a lower softening point temperature than the softening point temperature of the fiber cores. Preferably, the polymeric fibers are spunbond fibers and are bonded together through the application of heat and pressure. Where the fibers are sheathed fibers, interstices of the nonwoven mat are at least partially filled by a portion of the polymeric material of the sheaths that is dispersed into the interstices to reduce the porosity of the mat. In certain embodiments, the polymeric fibers on the top major surface of the mat are coated with a hydrophobic binder coating material, which is overlaid with a water repellant coating material, such as a filled asphalt, modified bitumen, or a non-asphaltic polymeric film, to increase the liquid water impermeability and enhance other physical properties of the mat.

15 Claims, 3 Drawing Sheets

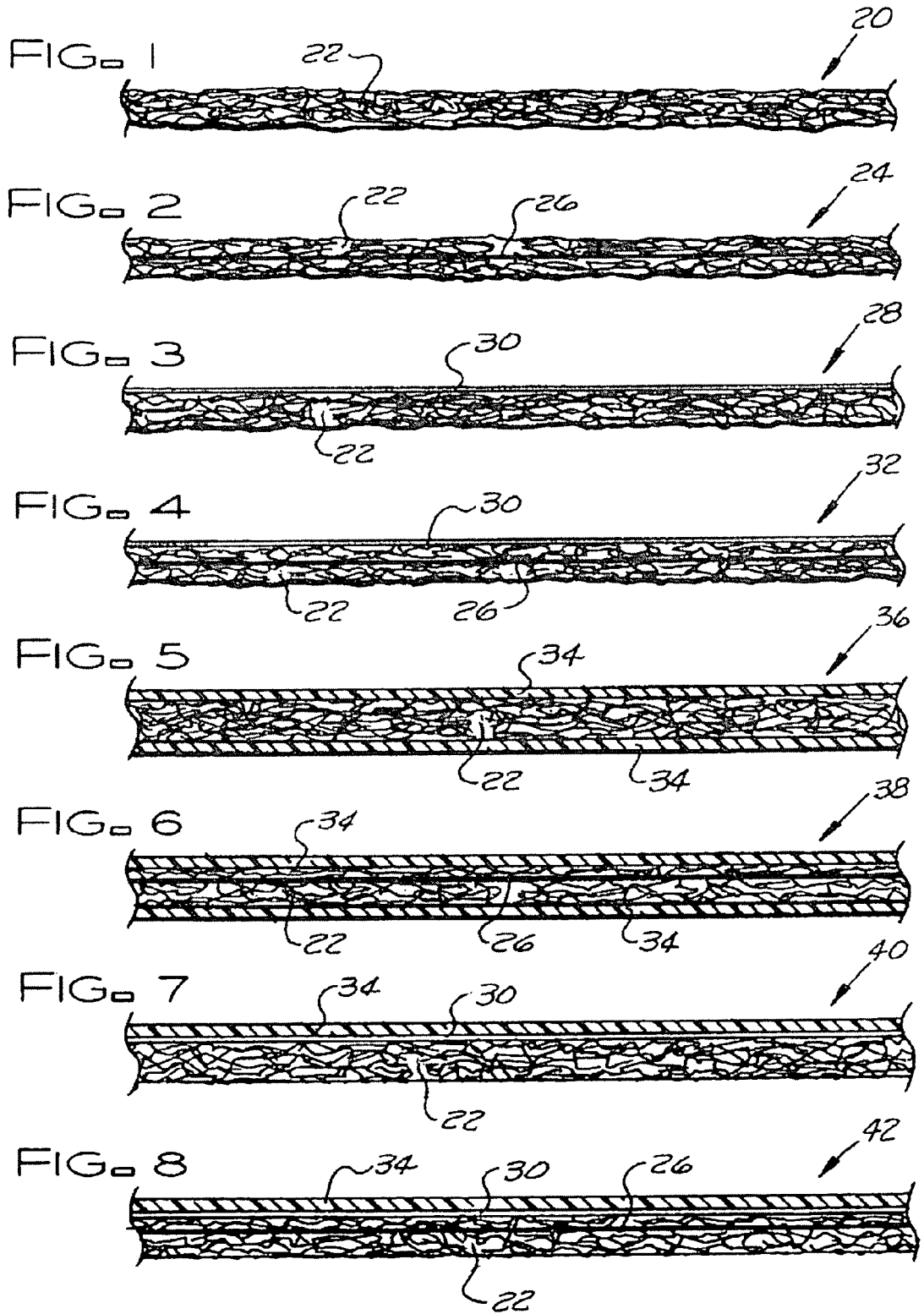

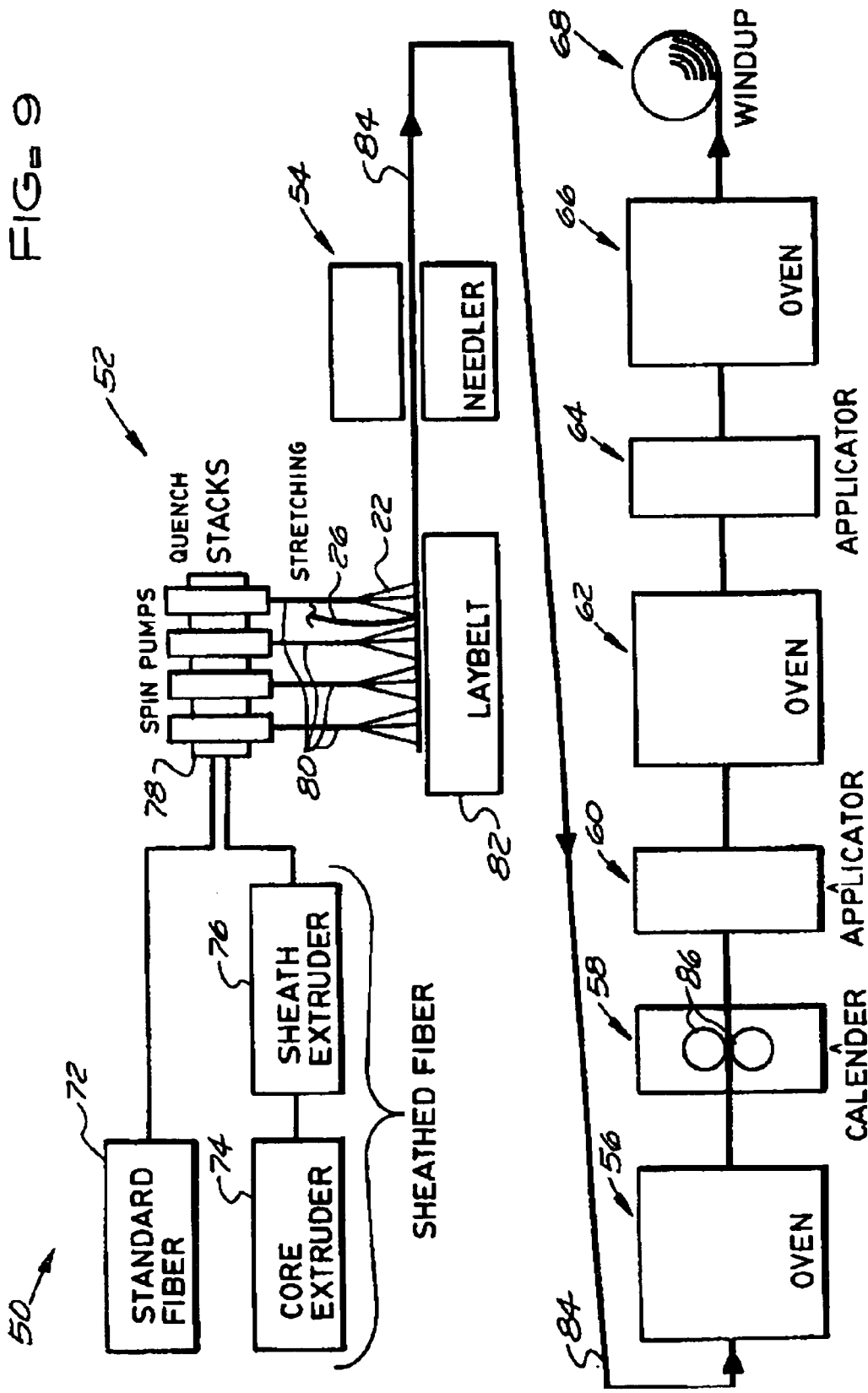

NONWOVEN POLYMERIC FIBER MAT COMPOSITES AND METHOD

This patent application is a continuation-in-part of patent application Ser. No. 11/102,897 filed on Apr. 8, 2005.

BACKGROUND OF THE INVENTION

The subject invention relates to lightweight nonwoven polymeric fiber mat composites and preferably, lightweight nonwoven polymeric fiber mat composites that are only coated on one major surface and are particularly well suited for use: as an underlayment in various building construction applications, such as but not limited to roofing underlayment applications, housewrap applications, non-slip surface applications, etc. and as facers for fibrous insulation boards, foam insulation boards, fibrous sheathing boards, foam sheathing boards, etc.

In a typical residential roofing construction, a roofing underlayment is installed on the wooden roof deck prior to installing the asphalt shingle, shake shingle, tile, or metal roofing system on the deck. The most common underlayments currently used in residential roofing construction are asphalt saturated organic felt underlayments that conform to ASTM Standard D 4869-02 entitled "Standard for Asphalt-Saturated Organic Felt Underlayment Used in Steep Slope Roofing", or ASTM D226. The asphalt saturated organic felt underlayments typically used with standard performance roofing shingle products are the No. 15 underlayments and the asphalt saturated organic felt underlayments typically used with higher performance roofing shingle products are the heavier No. 30 underlayments.

A primary purpose of the roofing underlayment is to provide a water transmission resistant or water shedding layer over the wooden roof deck prior to the installation of the residential roofing system on the deck. It is common roofing practice to build up redundant or multiple water shedding layers over the roof deck. With building construction schedules, including unanticipated delays in these schedules, the water transmission resistant layer to be formed by these roofing underlayments can be in place on the wooden roof deck for many months prior to the installation of the roofing system and is thus intended to protect the wooden roof deck from water damage due to inclement weather during this period. Once a roofing system is installed, a secondary purpose of these roofing underlayments is to provide another layer of water transmission resistant protection below the shingles, should water enter the roofing system due to wind driven rain, snow or ice buildup, or damaged or missing shingles.

With longer service life shingles coming into greater use, there has been and continues to be a need for roofing underlayments that have a longer service life and improved physical properties such as: a higher tear strength so that the underlayments can not be as easily torn during installation or while exposed on a roof deck during subsequent construction activity; a higher resistance to deterioration when left exposed to the weather for more than a few days; a greater resistance to fastener pull through so that the underlayments are not blown away or torn during exposure to inclement weather conditions; a greater resistance to deterioration when installed under a shingle layer in a roofing system; and a greater resistance to fungi growth while in service.

SUMMARY OF THE INVENTION

The nonwoven mat composites and building construction underlayments of the subject invention provide a solution to the problems associated with the use of asphalt saturated organic felt roofing underlayments, etc. by providing lightweight mat composites and building construction underlayments for roofing and other building construction applications (e.g. housewrap applications, non-slip surfaces) that: are water transmission resistant; have a high tear strength; have a high resistance to fastener pull through; are not easily torn during installation or while exposed on a roof deck or other construction surface during subsequent construction activity; can be left exposed to the weather on a roof deck or other construction surface for extended periods of time without any appreciable deterioration; do not appreciably deteriorate beneath a layer of shingles over the service life of a roofing system; are fungi resistant over the anticipated service life of the underlayments as substrates of a roofing system; and are economical to produce. When compared to conventional asphalt saturated organic felt roofing underlayments, the building construction underlayments of the subject invention are light in weight and can be packaged, stored, shipped, and handled in roll sizes of greater widths and/or lengths than those used for conventional asphalt saturated organic felt roofing underlayments. With improved tear and fastener pull through resistance and in some embodiments a self-adhering bottom major surface, fewer fasteners could be used to secure the building construction underlayments of the subject invention to a roof deck thereby saving material, labor, and other associated installation costs.

The building construction underlayments and other construction composites of the subject invention are or include a flexible nonwoven mat of the subject invention that is made with polymeric fibers. The polymeric fibers are uniformly dispersed or substantially uniformly dispersed throughout the nonwoven mat. While the nonwoven mat can be made of staple polymeric fibers, preferably, the nonwoven mat of the subject invention is made of generally continuous standard spunbond polymeric fibers or of generally continuous sheathed spunbond polymeric fibers.

When the nonwoven mat of the subject invention is made of standard polymeric fibers, the polymeric fibers (homopolymer fibers) are made of one polymeric material and that polymeric material is used to bond the polymeric fibers together at their points of intersection through the application of heat and pressure to the nonwoven mat during the manufacturing process.

When the nonwoven mat of the subject invention is made of sheathed polymeric fibers, the sheathed polymeric fibers (co-polymer fibers) have inner fiber cores made of a first polymeric material having a first softening point temperature and outer fiber sheaths made of a second polymeric material having a second softening point temperature that is less than the softening point temperature of the fiber cores. Through the application of heat and pressure to the nonwoven mat during the manufacturing process, the sheathed polymeric fibers of the nonwoven mat are bonded together at their points of intersection with the polymeric sheath material and a portion of the polymeric sheath material is dispersed into and at least partially fills interstices of the nonwoven mat to reduce the porosity of the nonwoven mat. With their higher softening point temperature, the fiber cores enable the formation of an underlayment that has a higher strength and integrity by maintaining greater fiber integrity during and after the application of the heat and pressure to the nonwoven mat during the manufacturing process that bonds the polymeric fibers together with the polymeric sheath material and disperses a portion of the polymeric sheath material into the interstices of the nonwoven mat.

To increase the overall strength and integrity of the nonwoven mat of the subject invention and to increase the resistance of the nonwoven mat of the subject invention to delamination, the polymeric fibers of the nonwoven mat may be further entangled after the nonwoven mat is initially formed and prior to the application of heat and pressure to the nonwoven mat during the manufacturing process to bond the fibers of the mat together. To further increase the strength the nonwoven mat of the subject invention, the nonwoven mat may include reinforcement such as but not limited to a scrim, continuous parallel reinforcing strands, or swirls of continuous reinforcement strands that are typically contained within the mat.

In a first embodiment of the subject invention, a hydrophobic binder coating material (such as but not limited to a hydrophobic acrylic binder) is applied to the polymeric fibers of a nonwoven mat of the subject invention on at least one major surface of the mat to form a nonwoven mat polymeric fiber mat composite of the subject invention. In a second embodiment of the invention, a hydrophobic binder coating material (such as but not limited to a hydrophobic acrylic binder) is applied to the polymeric fibers of a nonwoven mat of the subject invention on at least one major surface of the mat and in addition, a water repellant coating or coatings (typically a water repellant additive such as but not limited to a fluorocarbon material, an oxidized asphalt, a modified asphalt, or a non-asphaltic polymeric film) is or are also applied to one or both major surfaces of the nonwoven mat to form a nonwoven polymeric fiber mat composite of the subject invention. In a third embodiment of the subject invention, a water repellant coating or coatings (typically a water repellant additive such as but not limited to a fluorocarbon material) is or are applied to one or both major surfaces of a nonwoven mat of the subject invention without the prior application of the hydrophobic binder coating material to form a nonwoven polymeric fiber mat composite of the subject invention. In a fourth embodiment of the subject invention, any of the first three embodiments of the nonwoven polymeric fiber mat composite set forth in this paragraph includes a self-adhering bottom layer for bonding the nonwoven polymeric fiber mat composite to an underlying surface.

Preferably, the polymeric fibers of the nonwoven mats of these four embodiments of the nonwoven mat composites of the subject invention are polyester fibers and more preferably generally continuous standard or sheathed spunbond polyester fibers. The four nonwoven mat composites thus formed are liquid water transmission resistant and have a water vapor permeably selected to suit the intended application and preferably is substantially liquid water impermeable (passes ASTM test designation D 4869-02 for liquid water transmission) and water vapor permeable selected to suit the intended application.

Where the nonwoven mat composites discussed above are to be used for certain applications, such as prefabricated roofing underlayments or non-slip surfacing sheets, the top major surfaces of the prefabricated nonwoven mat composites of the subject invention can be made slip resistant by applying gritty coating materials (e.g. coating materials containing sand, coal slag, rubber or plastic particles such as pulverized recycled tire scrap, or mixtures of such gritty materials) to these top major surfaces, by blending the gritty materials with the film materials forming these top surfaces, and/or by texturing these top major surfaces (e.g. with an embossed pattern or discontinuous topical coating) during the manufacture of the nonwoven mat composites. For certain applications, additional coating material(s) may be applied to one or both major surfaces of the nonwoven mat composites of the subject invention to provide the finished products with desired physical characteristics for those particular applications such as but not limited to greater liquid water impermeability, sealability around fastener penetrations, etc. The nonwoven mats and nonwoven mat composites of the subject invention may not only be used as prefabricated building construction underlayment roll goods but as reinforcement layers for other building construction roll goods and roll goods other than building construction roll goods.

BRIEF DESCRIPTION OF THE DRAWINGS

FIG. 1 is a partial schematic side view of a nonwoven mat of the subject invention that can be used as a first prefabricated building construction underlayment or roll good reinforcing layer of the subject invention.

FIG. 2 is a partial schematic side view of a nonwoven mat of the subject invention that includes a reinforcement and can be used as a second prefabricated building construction underlayment or roll good reinforcing layer of the subject invention.

FIG. 3 is a partial schematic side view of a nonwoven mat composite of the subject invention that has a hydrophobic binder material applied to one major surface of the nonwoven mat of FIG. 1 and that can be used as a third prefabricated building construction underlayment or roll good reinforcing layer of the subject invention.

FIG. 4 is a partial schematic side view of a nonwoven mat composite of the subject invention that has a hydrophobic binder material applied to one major surface of the nonwoven mat of FIG. 2 and that can be used as a fourth prefabricated building construction underlayment or roll good reinforcing layer of the subject invention.

FIG. 5 is a partial schematic side view of the nonwoven mat of FIG. 1, with water repellant coating material applied directly to the top and bottom major surfaces of the nonwoven mat, that can be used as a fifth prefabricated building construction underlayment or roll good reinforcing layer of the subject invention.

FIG. 6 is a partial schematic side view of the nonwoven mat of FIG. 2, with water repellant coating material applied directly to the top and bottom major surfaces of the nonwoven mat, and that can be used as a sixth prefabricated building construction underlayment or roll good reinforcing layer of the subject invention.

FIG. 7 is a partial schematic side view of the nonwoven mat composite of FIG. 3, with water repellant coating or film material applied over the hydrophobic binder material on the top major surface of the nonwoven mat, that can be used as a seventh prefabricated building construction underlayment or roll good reinforcing layer of the subject invention.

FIG. 8 is a partial schematic side view of the nonwoven mat composite of FIG. 4, with water repellant coating or film material applied over the hydrophobic binder material on the top major surface of the nonwoven mat, that can be used as a third prefabricated building construction underlayment or roll good reinforcing layer of the subject invention.

FIG. 9 is a process flow chart of a production line for forming the prefabricated building construction underlayments or reinforcing layers of the subject invention by the method of the subject invention.

DESCRIPTION OF THE PREFERRED EMBODIMENTS

Figure 10:
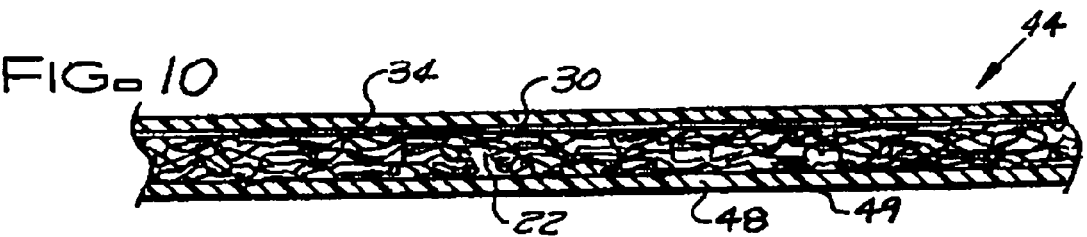
FIG. 10 is a partial schematic side view of the nonwoven mat composite of FIG. 3, with a water repellant coating or film material applied over the hydrophobic binder material on the top major surface of the nonwoven mat and a self-adhering layer applied directly to the bottom major surface of the nonwoven mat and overlaid with a release sheet.

FIG. 1 schematically shows a flexible nonwoven mat 20 of the subject invention that forms a first flexible prefabricated building construction underlayment, housewrap, facer for fibrous and foam insulations, and/or roll good reinforcing layer of the subject invention. The flexible nonwoven mat 20 is particularly well suited for use as a prefabricated roofing underlayment or housewrap that can be packaged, stored, shipped, and handled prior to installation in roll form. The flexible nonwoven mat 20 is made of polymeric fibers 22 and has a weight between 60 grams per square meter (60 g/m$^2$) and 150 grams per square meter (150 g/m$^2$) and typically a weight of about 90 to 110 grams per square meter (90 to 110 g/m$^2$). The polymeric fibers 22 of the mat 20 are uniformly dispersed or substantially uniformly dispersed throughout the nonwoven mat.

The polymeric fibers 22 may be standard polymeric fibers (homopolymer fibers) or sheathed polymeric fibers (co-polymer fibers) that have inner fiber cores and outer fiber sheaths. When the nonwoven mat 20 is made of standard polymeric fibers, the nonwoven mat preferably weighs between 85 g/m$^2$ and 120 g/m$^2$. When the nonwoven mat 20 is made of sheathed polymeric fibers, the nonwoven mat preferably weighs between 100 g/m$^2$ and 130 g/m$^2$. Preferably, the polymeric fibers 22 are generally continuous spunbond polyester fibers between about 2 denier and about 4 denier.

Where the polymeric fibers are sheathed polymeric fibers, the fiber cores are of a first polymeric material and the fiber sheaths are of a second polymeric material. The second polymeric material of the fiber sheaths has a lower temperature softening point than a softening point temperature of the first polymeric material of the fiber cores. These sheathed polymeric fibers are between 60% and 95% by weight the first polymeric material of the fiber cores and between 5% and 40% by weight the second polymeric material of the fiber sheaths and preferably, about 88% by weight the first polymeric material of the fiber cores and about 12% by weight the second polymeric material of the fiber sheaths. Preferably, the second polymeric material of the fiber sheaths has a softening point temperature at least 20° C. less than the soften point temperature of the first polymeric material of the fiber cores. The preferred first and second polymeric materials for the fiber cores and sheaths are polyester materials having softening point temperatures between about 255° C. and about 265° C. and between about 220° C. and about 235° C. respectively.

The polymeric fibers 22 of the nonwoven mat 20 may be staple fibers and the nonwoven mat 20 may be formed by a conventional wet laid or air laid process. However, as mentioned above, preferably, the polymeric fibers 22 of the nonwoven mat 20 are generally continuous spunbond polymeric fibers and the nonwoven mat 20 is air laid. After the nonwoven mat 20 has been initially formed and prior to bonding the polymeric fibers 22 of the nonwoven mat together, the polymeric fibers of the nonwoven mat 20 may further entangled (e.g. by needle punching) to increase the integrity of the nonwoven mat 20 and the resistance the nonwoven mat 20 to delamination. Whether or not the polymeric fibers 22 are further entangled, the polymeric fibers 22 are uniformly dispersed or substantially uniformly dispersed throughout the nonwoven mat 20.

The polymeric fibers 22 of the nonwoven mat 20 are bonded together at their points of intersection through: a) an application of heat and pressure to the nonwoven mat that makes portions of polymeric fibers 22 at and for a certain distance below their surfaces soft and tacky and presses the fibers together at their points of intersection; and b) a subsequent cooling of the nonwoven mat that resolidifies the soft and tacky portions of the fibers so that the polymeric fibers are bonded together at their points of intersection. Where sheathed polymeric fibers are used, the polymeric fibers 22 are bonded together by the second polymeric material of the fiber sheaths and interstices of the nonwoven mat 20 are at least partially filled by a portion of the second polymeric material of the fiber sheaths that has been dispersed into the interstices of the nonwoven mat to reduce the porosity of the nonwoven mat 20 and thus any underlayment, housewrap, or reinforcing layer made from the nonwoven mat 20.

FIG. 2 schematically shows a flexible nonwoven mat 24 of the subject invention that forms a second flexible prefabricated building construction underlayment, housewrap, or roll good reinforcing layer of the subject invention. The flexible nonwoven mat 24 is particularly well suited for use as a prefabricated roofing underlayment or housewrap that can be packaged, stored, shipped, and handled prior to installation in roll form. The flexible nonwoven mat 24 is made of polymeric fibers 22, has a weight between 60 grams per square meter (60 g/m$^2$) and 150 grams per square meter (150 g/m$^2$), and includes a reinforcement 26 such as a flexible scrim or generally continuous multifilament glass yarns. Preferably, the polymeric fibers 22 are generally continuous spunbond polyester fibers between about 2 denier and about 4 denier. When a scrim is utilized as the reinforcement, preferably, the scrim is a fiberglass scrim having a weight between 5 grams per square meter (5 g/m$^2$) and 15 grams per square meter (15 g/m$^2$). Preferably, the scrim, generally continuous multifilament yarns, or other reinforcement 26 is contained within the nonwoven mat 24 rather than being applied to a top or bottom major surface of the nonwoven mat 24.

Preferably, the scrim, generally continuous multifilament glass yarns, or other reinforcement 26 is introduced into the nonwoven mat 24 as the nonwoven mat is being initially formed and prior to any subsequent further entanglement of the polymeric fibers 22 of the nonwoven mat 24 (e.g. by needle punching). Other than the inclusion of the scrim, generally continuous multifilament glass yarns or other reinforcement 26 within the nonwoven mat 24, the nonwoven mat 24 is the same as the nonwoven mat 20.

FIG. 3 schematically shows a flexible nonwoven mat composite 28 of the subject invention that forms a third flexible prefabricated building construction underlayment, housewrap, or roll good reinforcing layer of the subject invention. The flexible nonwoven mat composite 28 is particularly well suited for use as a prefabricated roofing underlayment or housewrap that can be packaged, stored, shipped, and handled prior to installation in roll form. The flexible nonwoven mat composite 28 includes a hydrophobic binder coating material 30 applied directly to and coating the polymeric fibers 22 on at least the top major surface of the nonwoven mat composite. For certain applications, the polymeric fibers 22 on the bottom major surface of the nonwoven mat composite could also be coated with the hydrophobic binder coating material 30. Other than coating the polymeric fibers on the top major surface and possibly the bottom major surface of the nonwoven mat composite with the hydrophobic binder coating material 30, the nonwoven mat composite 28 is the same as the nonwoven mat 20.

Preferably, the nonwoven mat composite 28 is between 59% by weight and 87% by weight the polymeric material(s) of the polymeric fibers 22 and between 13% by weight and 41% by weight hydrophobic binder coating material 30 and more preferably, the nonwoven mat composite 28 is between 65% by weight and 80% by weight the polymeric material(s) of the polymeric fibers 22 and between 20% by weight and 35% by weight hydrophobic binder coating material 30. To make the nonwoven mat composite 28 more slip resistant, the nonwoven mat composite 28 may also include a gritty surfacing material (e.g. sand, coal slag, rubber or plastic particles such as pulverized recycled tire scrap, or mixtures of these gritty materials) on one major surface of the nonwoven mat composite and that gritty surfacing material may be contained in the hydrophobic binder coating material 30. Preferably, where the nonwoven mat composite 28 includes a gritty surfacing material, the nonwoven mat composite 28 is between 59% by weight and 87% by weight the polymeric material(s) of the polymeric fibers 22, between 13% by weight and 40% by weight hydrophobic binder coating material 30, and between 1% and 5% by weight the gritty surfacing material and more preferably, the nonwoven mat composite 28 is between 65% by weight and 80% by weight the polymeric material(s) of the polymeric fibers 22, between 20% by weight and 34% by weight hydrophobic binder coating material 30, and between 1% and 5% by weight the gritty surfacing material.

FIG. 4 schematically shows a flexible nonwoven mat composite 32 of the subject invention that forms a fourth flexible prefabricated building construction underlayment, housewrap, or roll good reinforcing layer of the subject invention. The nonwoven mat composite 32 is particularly well suited for use as a prefabricated roofing underlayment or housewrap that can be packaged, stored, shipped, and handled prior to installation in roll form. The flexible nonwoven mat composite 32 is made of polymeric fibers 22; has a weight between 60 grams per square meter (60 g/m$^2$) and 150 grams per square meter (150 g/m$^2$); and includes a reinforcement 26 such as a flexible scrim or generally continuous multifilament glass yarns and a hydrophobic binder coating material 30 applied directly to and coating the polymeric fibers 22 on the top major surface of the nonwoven mat composite. For certain applications, the polymeric fibers 22 on the bottom major surface of the nonwoven mat composite 32 could also be coated with the hydrophobic binder coating material 30. When a scrim is utilized as the reinforcement 26, preferably, the scrim is a fiberglass scrim having a weight between 5 grams per square meter (5 g/m$^2$) and 15 grams per square meter (15 g/m$^2$). Preferably, the scrim, generally continuous multifilament glass yarns, or other reinforcement 26 is contained within the nonwoven mat composite 32 rather than being applied to a top or bottom major surface of the nonwoven mat composite 32.

Preferably, the scrim, generally continuous multifilament glass yarns, or other reinforcement 26 is introduced into the nonwoven mat composite 32 as the nonwoven mat is being initially formed and prior to any subsequent further entanglement of the polymeric fibers 22 of the nonwoven mat composite 32 (e.g. by needle punching). Other than the hydrophobic binder coating material 30 applied to and coating the polymeric fibers 22 on the top major surface and possibly the bottom major surface of the nonwoven mat composite, the nonwoven mat composite 32 is the same as the nonwoven mat 24.

Preferably, the nonwoven mat composite 32 is between 59% by weight and 87% by weight the polymeric materials of the polymeric fibers 22 and between 13% by weight and 41% by weight the hydrophobic binder coating material 30 and more preferably the nonwoven mat composite 32 is between 65% by weight and 80% by weight the polymeric materials of the polymeric fibers 22 and between 20% by weight and 35% by weight the hydrophobic binder coating material 30. To make the nonwoven mat composite 32 more slip resistant, the nonwoven mat composite 32 may also include a gritty surfacing material (e.g. sand, coal slag, rubber or plastic particles such as pulverized recycled tire scrap, or mixtures of these gritty materials) on one major surface of the nonwoven mat composite and that gritty surfacing material may be contained in the hydrophobic binder coating material 30. Preferably, where the nonwoven mat composite 32 includes a gritty surfacing material, the nonwoven mat composite 32 is between 59% by weight and 87% by weight the polymeric material(s) of the polymeric fibers 22, between 13% by weight and 40% by weight hydrophobic binder coating material 30, and between 1% and 5% by weight the gritty surfacing material and more preferably, the nonwoven mat composite 32 is between 65% by weight and 80% by weight the polymeric material(s) of the polymeric fibers 22, between 20% by weight and 34% by weight hydrophobic binder coating material 30, and between 1% and 5% by weight the gritty surfacing material.

Typically, the hydrophobic binder coating material 30 coating the polymeric fibers 22 on the top major surface of the nonwoven mats 20 and 24 to form the nonwoven mat composites 28 and 32 and further enhance the water repellency of the nonwoven mats is a hydrophobic acrylic binder coating material with or without filler(s) and with or without water repellant additive(s). Examples of hydrophobic binder coating materials that may be used as the hydrophobic binder coating material 30 on the top major surfaces of the nonwoven composite mats 28 and 32 are:

1) vinyl acrylic binders with or without filler(s) and water repellant additive(s) such as a binder marketed by OmNova under the trade designation "Sequabond 145";
2) acrylic binders with or without filler(s) and water repellant additive(s) such as a binder marketed by OmNova under the trade designation "FDP 60110-18"; and
3) styrenated acrylic binders with or without filler(s) and water repellant additive(s) such as a binder marketed by ParaChem under the trade designation "RD-F22".

The nonwoven mat and mat composites 20, 24, 28 and 32 that form the first four prefabricated building construction underlayments, housewraps, facers, and roll good reinforcing layers of the subject invention may be made in various widths (typically between about 3 feet and about 5 feet in width) and in various lengths (typically between about 300 and about 1000 feet in length). The nonwoven mat and mat composites 20, 24, 28 and 32 are liquid water transmission resistant and water vapor permeable, and preferably are substantially liquid water impermeable (pass ASTM test designation D 4869-02 for liquid water transmission) and water vapor permeable. Preferably, the nonwoven mat and mat composites 20, 24, 28, and 32 have a water vapor transmission rate of 5 perms or greater as measured in accordance with ASTM E 96-00 (dry cup method).

Preferably, the nonwoven mat and mat composites 20, 24, 28 and 32 that form the first four prefabricated building construction underlayments, housewraps, facers, and roll good reinforcing layers of the subject invention, when made of standard generally continuous spunbond polyester fibers, exhibit the following physical properties within a tolerance of ±15%: tear resistance in pounds machine direction/cross machine direction—trap 16/12—tongue 5/7; puncture resistance in pounds—39; nail pull through resistance in pounds—40; weight in pounds per square—2.9; weight in pounds per ten squares—31.3; and thickness in mils 15.

Preferably, the nonwoven mat and mat composites 20, 24, 28 and 32 that form the first four prefabricated building construction underlayments, housewraps, facers, and roll good reinforcing layers of the subject invention, when made of sheathed generally continuous spunbond polyester fibers, exhibit the following physical properties within a tolerance of ±15%: tear resistance in pounds machine direction/cross machine direction—trap 11/5—tongue 2.8/3.8; puncture resistance in pounds—43; nail pull through resistance in pounds—37; weight in pounds per square—3; weight in pounds per ten squares—30.2; and thickness in mils 11.4.

The color of the top major surfaces of the nonwoven mats and mat composites 20, 24, 28, and 32 forming the prefabricated roofing underlayments, housewraps, and facers of the subject invention may range from a white color to darker colors if desired by using colored fibers (e.g. fibers that are colored by introducing carbon black or other pigments into the polymer of the fibers to provide the nonwoven mats or mat composites with a desired color) or by including carbon black or other pigments in the hydrophobic binder. The hydrophobic binder coating 30 is applied to the top major surfaces of the nonwoven mat composites 28 and 32 and thus the top major surfaces of the prefabricated roofing underlayments, housewraps, and facers formed by the nonwoven mat composites 28 and 32 to make these top major surfaces more water shedding and water transmission resistant in service.

As mentioned above, the top major surfaces of the nonwoven mats and mat composites 20, 24, 28 and 32 and thus the prefabricated roofing underlayments and facers formed from these nonwoven mat and mat composites may be made slip resistant. The top major surfaces of the prefabricated roofing underlayments and facers formed by the nonwoven mats 22 and 24 and mat composites 28 and 32 of the subject invention can be made slip resistant by applying gritty coating materials (e.g. sand, coal slag, rubber or plastic particles such as pulverized recycled tire scrap, or mixtures of these gritty materials) to these top major surfaces and/or by texturing these top major surfaces (e.g. with an embossed pattern or discontinuous topical coating) during the manufacture of the nonwoven mat or mat composites to form the prefabricated roofing underlayments. Where the nonwoven mat composites include a scrim, the scrim may also contribute to the slip resistance of the prefabricated roofing underlayment or facer.

The flexible nonwoven mats 20 and 24 can have water repellant coating or film material 34 applied directly to and coating and/or overlaying the polymeric fibers 22 on one or, as shown, applied directly to and coating and/or overlaying the polymeric fibers on both major surfaces of these nonwoven mats to form flexible nonwoven mat composites 36 and 38 such as those schematically shown in FIGS. 5 and 6 that are more water transmission resistant than the nonwoven mats 20 and 24. The nonwoven mat composites 36 and 38 form flexible prefabricated building construction underlayments, housewraps, facers, and roll good reinforcing layers of the subject invention. The flexible nonwoven mat composites 36 and 38 are particularly well suited for use as prefabricated roofing underlayments or housewraps that can be packaged, stored, shipped, and handled prior to installation in roll form. Other than the coating and/or overlaying of the polymeric fibers on the top and/or bottom major surface of the nonwoven mats 20 and 24 with the water repellant coating or film material 34, the nonwoven mat composites 36 and 38 are the same as the nonwoven mats 20 and 24 respectively.

For the examples of water repellant coating materials set forth three paragraphs below, the nonwoven mat composites 36 and 38 are preferably between 94% by weight and 99% by weight the polymeric material(s) of the polymeric fibers 22 and between 1% by weight and 6% by weight the water repellant coating material 34. To make the nonwoven mat composites 36 and 38 more slip resistant, the nonwoven mat composites 36 and 38 may also include a gritty surfacing material (e.g. sand, coal slag, rubber or plastic particles such as pulverized recycled tire scrap, or mixtures of these gritty materials) on one or both major surfaces of the nonwoven mat composites and that gritty surfacing material may be contained in the water repellant coating material 34. Where the nonwoven mat composites 36 and 38 include a gritty surfacing material and the type of water repellant coating materials set forth three paragraphs below, preferably, the nonwoven mat composites 36 and 38 are between 89% by weight and 98% by weight the polymeric material(s) of the polymeric fibers 22, between 1% by weight and 6% by weight water repellant coating material 34, and between 1% and 5% by weight the gritty surfacing material.

The flexible nonwoven mats 28 and 32 can have water repellant coating or film material 34 applied to and coating and/or overlaying the polymeric fibers 22 previously coated with the hydrophobic binder coating material 30 on top the major surfaces of the nonwoven mats as shown in FIGS. 7 and 8; applied directly to and coating and/or overlaying the polymeric fibers on the bottom major surfaces of the nonwoven mats; or applied to and coating and/or overlaying the polymeric fibers 22 previously coated with the hydrophobic binder coating material 30 on the top major surfaces of the nonwoven mats and also applied directly to the polymeric fibers on the bottom major surfaces of the nonwoven mats to form flexible nonwoven mat composites 40 and 42 that are more water transmission resistant than the nonwoven mats 28 and 32. The nonwoven mat composites 40 and 42 form flexible prefabricated building construction underlayments, housewraps, facers, and roll good reinforcing layers of the subject invention. The flexible nonwoven mat composites 40 and 42 are particularly well suited for use as prefabricated roofing underlayments and housewraps that can be packaged, stored, shipped, and handled prior to installation in roll form. Other than the coating and/or overlaying of the polymeric fibers on the top and/or bottom major surface of the nonwoven mats 28 and 32 with the water repellant coating or film material 34, the nonwoven mat composites 40 and 42 are the same as the nonwoven mats 28 and 32 respectively.

For the type of water repellant coating materials set forth in the following paragraph, preferably, the nonwoven mat composites 40 and 42 are between 59% by weight and 89% by weight the polymeric material(s) of the polymeric fibers 22, between 10% and 35% by weight hydrophobic binder material 30, and between 1% by weight and 6% by weight the water repellant coating material 34. To make the nonwoven mat composites 40 and 42 more slip resistant, the nonwoven mat composites 40 and 42 may also include a gritty surfacing material (e.g. sand, coal slag, rubber or plastic particles such as pulverized recycled tire scrap, or mixtures of these gritty materials) on one or both major surfaces of the nonwoven mat composites and that gritty surfacing material may be contained in the water repellant coating material 34. Where the nonwoven mat composites 36 and 38 include a gritty surfacing material and the type of water repellant coating materials set forth in the following paragraph, preferably, the nonwoven mat composites 36 and 38 are between 59% by weight and 87% by weight the polymeric material(s) of the polymeric fibers 22, between 10 and 30% by weight hydrophobic binder material, between 1% by weight and 6% by weight water repellant coating material 34, and between 1% and 5% by weight the gritty surfacing material.

Examples of water repellant coating materials that may be used to form the water repellant coating material 34 of the nonwoven composite mats 36, 38, 40 and 42 are materials such as but not limited to:

1) fluorocarbons with or without filler(s) such as fluorocarbon materials marketed by Apex under the trade designation "247/186 (FC)" or OmNova under the trade designation "X-Cape GFC";
2) silicone urethane fluorocarbons with or without filler(s) such as silicone urethane fluorocarbon materials marketed by Wacker under the trade designation "Exp 2830";
3) acrylic terpolymers with or without filler(s) such as acrylic terpolymer materials marketed by OmNova under the trade designation "FDP 60110-18";
4) silicones such as silicone materials marketed by Dow Corning under the trade designation "IE 1260 and 753F.

The nonwoven mat composites 36, 38, 40 and 42 that form the second four prefabricated building construction underlayments, housewraps, facers, and roll good reinforcing layers of the subject invention may be made in various widths (typically between about 3 feet and about 5 feet in width) and in various lengths (typically between about 300 and about 1000 feet in length). The nonwoven mat composites 36, 38, 40 and 42 described above and made with the hydrophobic binder coating materials 30 and water repellant coating materials 34 described above are liquid water transmission resistant and water vapor permeable, and preferably are substantially liquid water impermeable (pass ASTM test designation D 4869-02 for liquid water transmission) and water vapor permeable. Preferably, these nonwoven mat and mat composites 36, 38, 40 and 42 have a water vapor transmission rate of 0.10 perms or greater as measured in accordance with ASTM E 96-00 (dry cup method).

Preferably, the nonwoven mat and mat composites 36, 38, 40 and 42 that form the second four prefabricated building construction underlayments, housewraps, facers, and roll good reinforcing layers of the subject invention, when made of standard generally continuous spunbond polyester fibers and made with the hydrophobic binder coating materials 30 and the water repellant coating materials 34 described above, exhibit the following physical properties within a tolerance of ±15%: tear resistance in pounds machine direction/cross machine direction—trap 16/12—tongue 5/7; puncture resistance in pounds—39; nail pull through resistance in pounds—40; weight in pounds per square—2.9; weight in pounds per ten squares—31.3; and thickness in mils 15.

Preferably, the nonwoven mat and mat composites 36, 38, 40 and 42 that form the second four prefabricated building construction underlayments, housewraps, facers, and roll good reinforcing layers of the subject invention, when made of sheathed generally continuous spunbond polyester fibers and made with the hydrophobic binder coating materials 30 and the water repellant coating materials 34 described above, exhibit the following physical properties within a tolerance of ±15%: tear resistance in pounds machine direction/cross machine direction—trap 11/5—tongue 2.8/3.8; puncture resistance in pounds—43; nail pull through resistance in pounds—37; weight in pounds per square—3; weight in pounds per ten squares—30.2; and thickness in mils 11.4.

The color of the top major surfaces of the nonwoven mats and mat composites 36, 38, 40 and 42 forming the prefabricated roofing underlayments, housewraps, and facers of the subject invention may range from a white color to darker colors if desired by using colored fibers e.g. fibers that are colored by introducing carbon black or other pigments into the polymer of the fibers to provide the nonwoven mats or mat composites with a desired color. The water repellant coating or film material 34 of nonwoven mat composites 36 and 38 and hydrophobic binder coating material 30 and the water repellant coating or film material 34 of nonwoven mat composites 40 and 42 are applied to the top major surfaces of these nonwoven mat composites and thus the top major surfaces of the prefabricated roofing underlayments, housewraps, and facers formed by these nonwoven mat composites to make these top major surfaces more water shedding and water transmission resistant in service.

As mentioned above, the top major surfaces of the nonwoven mat composites 36, 38, 40 and 42 and thus the prefabricated roofing underlayments, housewraps, and facers formed from these nonwoven mat and mat composites may be made slip resistant. The top major surfaces of the prefabricated roofing underlayments, housewraps, and facers formed by the nonwoven mat composites 36, 38, 40 and 42 of the subject invention can be made slip resistant by applying gritty coating materials (e.g. sand, coal slag, rubber or plastic particles such as pulverized recycled tire scrap, or mixtures of these gritty materials) to these top major surfaces, by texturing these top major surfaces (e.g. with an embossed pattern or discontinuous topical coating) during the manufacture of the nonwoven mat or mat composites to form the prefabricated roofing underlayments, housewraps, and facers and/or by applying films to the composites that have textured surfaces. Where the nonwoven mat composites include a scrim, the scrim may also contribute to the slip resistance of the prefabricated roofing underlayment, housewrap, or facer.

Additional roll goods can be made with the nonwoven mat composites 40 and 42 by applying other coating or film materials 34 to the nonwoven mat composites 28 and 32 than those discussed above in connection within nonwoven mat composites 40 and 42. For example a modified bitumen coating material 34 may be applied to one or both major surfaces of the nonwoven mat composites 28 and 32 to make these nonwoven mat composites even more water repellant and/or to provide a medium for sealing around fastener penetrations through the nonwoven mat composites. When a modified bitumen coating is used, the modified bitumen coating may be any of various modified asphalts such as but not limited to: rubberized asphalts; softening temperature adjusted asphalts; asphalts filled with limestone, talc, and/or fire retardant fillers; asphalts containing mold or fungi resistant additives (such as but not limited to TBZ in amounts of about 500 ppm or more); asphalts containing non-blocking fatty amides; and/or asphalts containing an odor-reducing additive, such as essential plant oil(s), In a first preferred embodiment of the nonwoven mat composite 40 that is particularly well suited for use as a lightweight, high performance, roofing underlayment, the nonwoven mat composite 28 is coated on its upper major surface with a thin film of a filled asphalt or modified bitumen coating material 34 to form a nonwoven mat composite 40 having a nonwoven mat of polymeric fibers 22, an intermediate hydrophobic binder coating layer 30 applied to and coextensive with or substantially coextensive with the upper major surface of the nonwoven mat, and an upper filled asphalt or modified bitumen film layer 34 applied to and coextensive with or substantially coextensive with the intermediate hydrophobic binder coating layer 30. In the first preferred embodiment of the nonwoven mat composite 42 that is particularly well suited for use as a lightweight, high performance roofing underlayment, the nonwoven mat composite 32 is coated on its upper major surface with a thin film of a filled asphalt or modified bitumen coating material 34 to form a nonwoven mat composite 42 having a nonwoven, scrim reinforced, mat of polymeric fibers 22, an intermediate hydrophobic binder coating layer 30 applied to and coextensive with or substantially coextensive with the upper major surface of the nonwoven mat, and an upper filled asphalt or modified bitumen film layer 34 applied to and coextensive with or substantially coextensive with the intermediate hydrophobic binder coating layer 30. While the undersides of these nonwoven mat composites 40 and 42 could also be coated, in the preferred embodiments utilizing the filled asphalt or modified bitumen coating material 34 to form composites for use as a roofing underlayment shown in FIGS. 7 and 8, the undersides of the nonwoven mat composites 40 and 42 are not coated or provided with a polymeric film. Due to the unique properties of the nonwoven mat composites 28 and 32 used in the nonwoven mat composites 40 and 42 (especially when the nonwoven mat composites 28 and 32 are formed with generally continuous spunbond polymeric fibers), significantly less filled asphalt or modified bitumen is required to achieve or exceed the desired performance characteristics for these composites as roofing underlayments when compared to asphalt saturated organic felt roofing underlayments. This enables the roofing underlayments formed by these composites to be significantly lighter than modified bitumen saturated organic felt roofing underlayments. Filled asphalt or modified bitumen coated nonwoven mat composites 40, made slip resistant by a gritty coating material (e.g. sand, coal slag, rubber or plastic particles such as pulverized recycled tire scrap, or mixtures of these gritty materials) applied to the top major surfaces of the composites and weighing about 12.5 pounds per 100 square feet outperform asphalt saturated organic felts weighing 30 pounds per 100 square feet in the areas of tear strength, puncture resistance, UV resistance, truck pack density, roof coverage per roll of equal weight, lying flat without wrinkling or puckering, nail sealability, and ease of handling and equal or outperform these asphalt saturated organic felts in the areas of waterproofing and fire rating (the filled asphalt or modified bitumen coated composites 40 exhibit an Underwriters Laboratory Class A Fire Rating underneath fiberglass shingles).

The nonwoven mat composites 28 and 32 used in the filled asphalt or modified bitumen coated nonwoven mat composites 40 and 42 typically weigh about 2 pounds per 100 square feet. The filled asphalt or modified bitumen coating 34 of these nonwoven mat composites 40 and 42 preferably weighs about 10.5 pounds or less per 100 square feet and more preferably about 8 pounds or less per 100 square feet and preferably weighs at least 2.5 pounds per 100 square feet and more preferably at least 5.5 pounds per 100 square feet. When used to make the upper major surfaces of these nonwoven mat composites 40 and 42 more slip resistant, the gritty surfacing materials typically weigh between about 1 and about 2.5 pounds per 100 square feet.

An example of a filled asphalt composition that can be used for these composites is about:
64.6% by weight asphalt
35% by weight Filler (Calcium Carbonate/Limestone)
0.0 to 0.5% by weight Anti Oxidant/UV Stabilizer
0.0 to 0.1% by weight Biocide An example of a modified bitumen composition that can be used for these composites is about:
64.6% by weight asphalt
25% by weight Filler (Calcium Carbonate/Limestone)
8.0 to 15% by weight SBS polymer
0.0 to 0.5% by weight Anti Oxidant/UV Stabilizer
0.0 to 0.1% by weight Biocide Another example of a modified bitumen composition that can be used for these composites is about:
52% by weight Asphalt
40.8% by weight Filler (Calcium Carbonate/Limestone)
03.6% by weight Paraffin Wax
03.6% by weight Stearic Acid
00.5% by weight Anti Oxidant/UV Stabilizer
0.0 to 0.1% by weight Biocide These filled asphalt or modified bitumen coated nonwoven mat composites 40 and 42 typically weigh about 12.5 pounds per 100 square feet or less; have a thickness of about 25 mils (0.64 mm); have a Trap Tear Strength—MD of about 17.9 lbf (79.6 N); have a Trap Tear Strength—CD of about 13.3 lbf (59.2 N); have a Tensile Strength—MD of about 50.5 lbf/in (8.8 kN/m); have a Tensile Strength—CD of about 29.6 lbf/in (5.2 kN/m); have an Elongation to Breakage of about 47.7%; and a Water Vapor Transmission of about 0.10 Perms as measured in accordance with ASTM E 96-00 (dry cup method) entitled "Standard Test Methods for Water Vapor Transmission of Materials"; and are waterproof, passing the 4 hour water shower test as set forth in ASTM D 4869-02 entitled "Standard for Asphalt-Saturated Organic Felt Underlayment Used in Steep Slope Roofing".

In a second preferred embodiment of the nonwoven mat composite 40 that is particularly well suited for use as a lightweight, high performance roofing underlayment, the nonwoven mat composite 28 has a thin non-asphaltic polymeric film 34 (with or without fillers) applied to its upper major surface to form a roofing underlayment. This nonwoven mat composite 40 has a nonwoven mat of polymeric fibers 22, an intermediate hydrophobic binder coating layer 30 applied to and coextensive with or substantially coextensive with the upper major surface of the nonwoven mat, and an upper non-asphaltic polymeric film layer 34 applied to and coextensive with or substantially coextensive with the intermediate hydrophobic binder coating layer 30. While the undersides of these nonwoven mat composites 40 and 42 could also be coated or have a polymeric film layer, in the preferred embodiments utilizing the non-asphaltic polymeric film 34 to form composites for use as a roofing underlayment shown in FIGS. 7 and 8, the undersides of the nonwoven mat composites 40 and 42 are not coated or provided with a polymeric film layer. Due to the unique properties of the nonwoven mat composite 28 and 32 of the nonwoven mat composites 40 and 42 (especially when the nonwoven mat composites 28 and 32 are formed with generally continuous spunbond polymeric fibers), the use of these upper non-asphaltic polymeric film layers in combination with the nonwoven mat composites 28 and 32 provide a very light weight composite that achieves or exceeds the desired performance characteristics for these composites when used as roofing underlayments. This enables the roofing underlayments formed by these composites to be significantly lighter than modified bitumen saturated organic felt roofing underlayments. These nonwoven mat composites 40 and 42 are typically made slip resistant by texturing the top major surfaces (e.g. with an embossed pattern or discontinuous topical coating) of the non-asphaltic polymeric film layers 34 of the composites during their manufacture or by applying pretextured non-asphaltic polymeric film layers 34. The nonwoven mat composite 40, with a polyethylene film layer 34, typically weighs about 3.8 pounds per 100 square feet and outperforms asphalt saturated organic felts weighing 30 pounds per 100 square feet in the areas of tear strength, puncture resistance, UV resistance, truck pack density, roof coverage per roll of equal weight, and ease of handling and equal or outperform these asphalt saturated organic felts in the areas of waterproofing and fire rating (the non-asphaltic polymeric film composites 40 and 42 exhibit an Underwriters Laboratory Class A Fire Rating underneath fiberglass shingles).

The nonwoven mat composites 28 and 32 used in the non-asphaltic polymeric film layered nonwoven mat composites 40 and 42 typically weigh about 2 pounds per 100 square feet. The non-asphaltic polymeric films 34 of these nonwoven mat composites 40 and 42 preferably weigh between about 0.5 and about 2 pounds per 100 square feet and are preferably between about 1.5 and 2 mils in thickness. Examples of non-asphaltic polymeric films that may be used for the film layer 34 are: polypropylene or polyethylene films with a UV resistant additive (preferably embossed on the upper major surface with a diamond or taffeta pattern for slip resistance); polypropylene or polyethylene films with a UV resistant additive, that are coextruded in multiple layers with a thin top layer of ethylene vinyl acetate (EVA) or embossed on their upper major surfaces to provide slip resistance; nylon films; and films of polypropylene/polyethylene blended with EVA or polyvinyl chloride (PVC) and made with a non-migrating plasticizer, such as that marketed by DuPont under the trade designation "Elvaloy".

These non-asphaltic polymeric film overlaid nonwoven mat composites 40 and 42 with the non-asphaltic polymeric film layers 34 weigh 10 pounds per 100 square feet or less and typically weigh about 3.8 to 4 pounds per 100 square feet or less; have a thickness of about 15 mils (0.38 mm); have a Trap Tear Strength—MD of about 33.5 lbf (149.0 N); have a Trap Tear Strength—CD of about 26.9 lbf (119.7 N); have a Tensile Strength—MD of about 50.4 lbf/in (8.8 kN/m); have a Tensile Strength—CD of about 30.7 lbf/in (5.4 kN/m); have an Elongation to Breakage of about 51.3%; a Water Vapor Transmission of about 0.11 Perms as measured in accordance with ASTM E 96-00 (dry cup method) entitled "Standard Test Methods for Water Vapor Transmission of Materials"; and are waterproof, passing the 4 hour water shower test as set forth in ASTM D 4869-02 entitled "Standard for Asphalt-Saturated Organic Felt Underlayment Used in Steep Slope Roofing".

Figure 11:
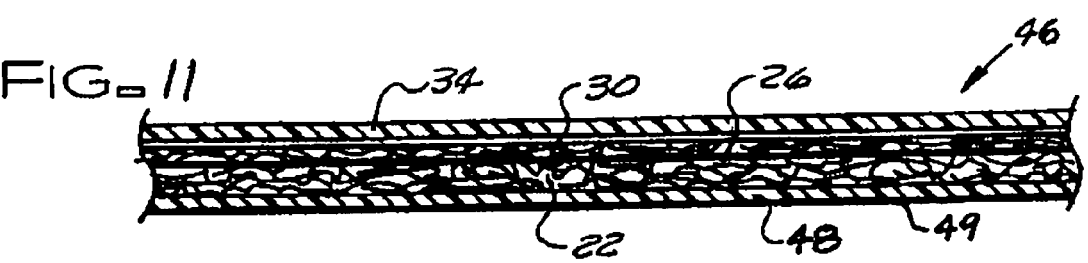
FIG. 11 is a partial schematic side view of the nonwoven mat composite of FIG. 4, with a water repellant coating or film material applied over the hydrophobic binder material on the top major surface of the nonwoven mat and a self-adhering layer applied directly to the bottom major surface of the nonwoven mat and overlaid with a release sheet.

The filled asphalt or modified bitumen coated and the non-asphaltic polymeric film overlaid nonwoven mat composites 40 and 42 can be modified to be self-adhering roofing underlayments that could eliminate or reduce the number of mechanical fasteners required to secure the roofing underlayments to a roof deck or underlying roofing underlayment layer, modified to be self-adhering ice shield roofing underlayments, modified and cut into strips for use as self-adhering door and/or window flashing tape, etc. As shown in FIG. 10, a first self-adhering roofing underlayment 44 includes an uppermost filled asphalt or modified bitumen layer or an uppermost non-asphaltic polymeric film layer 34 that may be made slip resistant by a gritty coating material (e.g. sand, coal slag, rubber or plastic particles such as pulverized recycled tire scrap, or mixtures of these gritty materials) on the exposed major surface of the layer 34, blended into the layer 34, and/or by texturing the exposed major surface of the layer 34. The filled asphalt or modified bitumen layer or non-asphaltic polymeric film layer 34 overlays, is bonded to, and is coextensive with or substantially coextensive with the hydrophobic binder coating layer 30. The hydrophobic binder coating layer 30 overlays, is bonded to, and is coextensive with or substantially coextensive with the top major surface of a nonwoven mat of polymeric fibers 22. A self-adhering layer 48 (e.g. a continuous or discontinuous pressure sensitive adhesive layer) overlays, is bonded to, and is coextensive with or substantially coextensive with the bottom major surface of the nonwoven mat. A release sheet 49 (e.g. a silicone treated kraft paper sheet) overlays, is releasably bonded to, and is coextensive with or substantially coextensive with the bottom major surface the self-adhering layer 48 to protect the self-adhering layer from degradation prior to the application of the self-adhering roofing underlayment 44 and enable the self-adhering roofing underlayment 44 to be packaged, stored, shipped, and handled in roll form. For application, the self-adhering roofing underlayment 44 is unrolled and, while removing the release sheet 49 from the self-adhering layer 48, applied to a roof deck or an underlying underlayment layer. Except for the use of the scrim 26 in the nonwoven mat, the self-adhering roofing underlayment 46 of FIG. 11 is the same as the self-adhering roofing underlayment 44.

Figure 12:
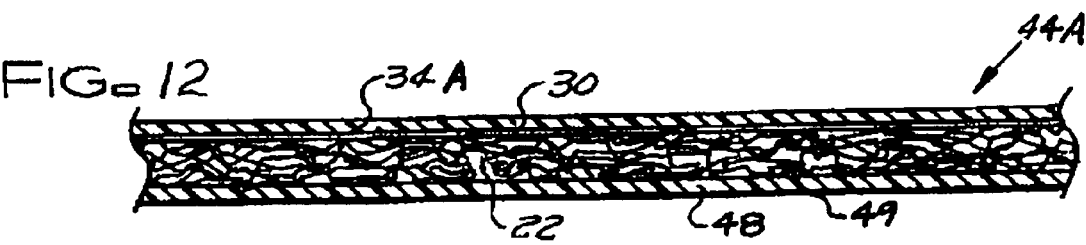
FIG. 12 is a partial schematic side view of the nonwoven mat composite of FIG. 3, with a non-slip water repellant coating or film material applied over the hydrophobic binder material on the top major surface of the nonwoven mat and a self-adhering layer applied directly to the bottom major surface of the nonwoven mat and overlaid with a release sheet.
Figure 13:
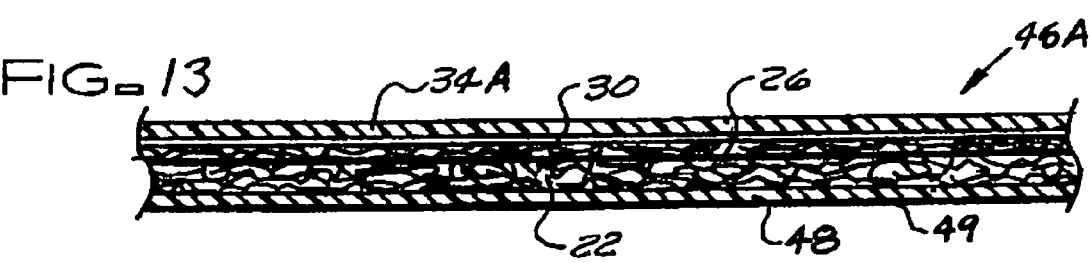
FIG. 13 is a partial schematic side view of the nonwoven mat composite of FIG. 4, with a non-slip water repellant coating or film material applied over the hydrophobic binder material on the top major surface of the nonwoven mat and a self-adhering layer applied directly to the bottom major surface of the nonwoven mat and overlaid with a release sheet.

While the filled asphalt or modified bitumen coated and the non-asphaltic polymeric film overlaid nonwoven mat composites 40 and 42 are particularly well suited for use as roofing underlayments, these filled asphalt or modified bitumen coated and non-asphaltic polymeric film overlaid nonwoven mat composites 40 and 42 can also be modified to form low cost, self-adhering temporary and disposable non-slip surfacing sheets 44A and 46A with non-slip top major surfaces for application to floors, stairs (e.g. temporary safety stair treads during construction), etc. As shown in FIG. 12, the first non-slip surfacing sheet 44A has a non-slip top major surface and includes an uppermost filled asphalt or modified bitumen layer or an uppermost non-asphaltic polymeric film layer 34A with a non-slip surface that has been made slip resistant by a gritty coating material (e.g. sand, coal slag, rubber or plastic particles such as pulverized recycled tire scrap, or mixtures of these gritty materials) on the exposed major surface of the layer 34A, blended into the layer 34A, and/or by texturing the exposed major surface of the layer 34A. The filled asphalt or modified bitumen layer or non-asphaltic polymeric film layer 34A overlays, is bonded to, and is coextensive with or substantially coextensive with the hydrophobic binder coating layer 30. The hydrophobic binder coating layer 30 overlays, is bonded to, and is coextensive with or substantially coextensive with the top major surface of the nonwoven mat of polymeric fibers 22. A self-adhering layer 48 (e.g. a continuous or discontinuous pressure sensitive adhesive layer) overlays, is bonded to, and is coextensive with or substantially coextensive with the bottom major surface of the nonwoven mat. A release sheet 49 (e.g. a silicone treated kraft paper sheet) overlays, is releasably bonded to, and is coextensive with or substantially coextensive with the bottom major surface of the self-adhering layer 48 to protect the self-adhering layer from degradation prior to the application of the non-slip surfacing sheet 44A and enable the non-slip surfacing sheet 44A to be packaged, stored, shipped, and handled in roll form. For application, the non-slip surfacing sheet 44A is unrolled and, while removing the release sheet 49 from the self-adhering layer 48, applied to a floor, stairs or other surface to make the surface slip resistant. Except for the use of the scrim 26 in the nonwoven mat, the non-slip surfacing sheet 46A of FIG. 13 is the same as the non-slip surfacing sheet 44A.

Another coating material option for the layer 34 of the nonwoven mats and nonwoven mat composites of the subject invention would be an acrylic based roof coating that is currently used as a field coating over various roof substrates in the field to provide roof systems with a light reflective surface. The acrylic based roof coating would be applied to the top major surfaces of the nonwoven mats and nonwoven mat composites and would typically be applied in a two-step process. First a gray acrylic coating would be applied then a white acrylic coating is applied over the gray acrylic coating. This type of acrylic based roof coating can be used to provide a nonwoven mat composite of the subject invention with an Energy Star Rating; to make a nonwoven mat composite that is waterproof, and to make a nonwoven mat composite that is fungus resistant, formaldehyde free, fire resistant, weather resistant to ultraviolet radiation and heat, and stain resistant to asphalt.

Preferably, the coating materials 30 and 34 are factory applied using in-line or off-line processes so that the resulting nonwoven mat composites are prefabricated roll goods. These coating could be applied by various coating techniques, such as but not limited to slot die coating, etc. When using slot die coating, the nonwoven mat or underlayment composites can be thin film coated on one side (on one major surface) with no or substantially no coating bleed through to the other side (other major surface) of the nonwoven mat or underlayment composite. These coatings can also be a thin film extruded layer of polyethylene, polypropylene, nylon, etc. applied on one or both sides. However, a preferred method for applying the coating layers 30 and 34 is with an "inking roll" that applies a very thin layer of the coating material. Preferably, the surface speed of the "inking roll" is less than the line speed of the mat so that the relative speeds between the inking roll and the major surface of the mat being coated causes the coating material forming the coating layer 30 or 34 of the composite to be back coated, ironed, and spread over the entire major surface of the mat to form a coating with a relatively smooth surface that, for the low coating weights used, better bridges and closes interstices or voids in the mat to reduce the porosity of the mat. As discussed above, the flexible roll good composites thus formed can be used for building construction applications, such as roofing applications, housewrap applications, and/or for other applications (such as but not limited to the formation of temporary non-slip surfaces) where composites exhibiting their physical characteristics are needed.

FIG. 9 is a schematic process flow chart of a production line 50 for forming the nonwoven mat and mat composites 22, 24, 28, 32, 36, 38, 40, and 42 of the subject invention and thus the prefabricated roll good building construction underlayments, roll good housewraps, and roll good reinforcing layer of the subject invention by the method of the subject invention. While the nonwoven mat and mat composites, underlayments, house wraps, reinforcing layers of the subject invention may be formed from staple fibers in a conventional wet laid or air laid process, preferred embodiments of the nonwoven mat and mat composites, underlayments, housewraps, and reinforcing layers of the subject invention are or include air laid generally continuous spunbond fiber nonwoven mats and the method of the subject invention will be described with the nonwoven mats being made from generally continuous spunbond polyester fibers. The production line 50 includes: a mat forming station 52 for forming a nonwoven mat of generally continuous spunbond fibers, a fiber entangling station 54, a mat preheating station 56, a thermal bonding station 58, a first coating material applicator station 60, a first curing station 62, a second coating material applicator station 64, a second curing station 66, and a windup station 68.

As shown, the mat forming station 52 includes a fiber extruder 72 for forming a polymeric material into standard polymeric fibers or a fiber core extruder 74 for forming a first polymeric material into fiber cores and a fiber sheath extruder 76 for forming a second polymeric material into sheaths that encase the cores formed by the core extruder 74 and thereby form sheathed polymeric fibers. Where the fibers are sheathed polymeric fibers, the second polymeric material of the fiber sheaths has a lower temperature softening point than a softening point temperature of the first polymeric material of the fiber cores. The standard or sheathed polymeric fibers are then stretched and formed into generally continuous spunbond fibers 22 of a desired denier in a conventional spunbond fiber forming apparatus 78 (including spin pumps and quench stacks that cool the fibers) and laid in successive drops 80 onto and across the width of a lay belt 82 to form a nonwoven mat 84 of generally continuous spunbond fibers 22.

Where a reinforcement 26 such as a scrim (preferably a fiberglass scrim) or generally continuous multifilament glass yarns are included within the nonwoven mat 84, the reinforcement material forming the reinforcement layer 26 is preferably introduced into the nonwoven mat being produced by introducing the reinforcement layer into the nonwoven mat 84 between two of the spunbond fiber drops 80 (e.g. as shown in FIG. 9, between the third and fourth drops) so that the reinforcement 26 is contained within the nonwoven mat 84 rather than being located on one of the major surfaces of the nonwoven mat. This location of the scrim, generally continuous multifilament glass yarns or other reinforcement 26 within the nonwoven mat 84 provides the nonwoven mat with greater integrity.

The generally continuous spunbond fibers 22 of the nonwoven mat 84, with or without a reinforcement 26 contained within the nonwoven mat, may be further entangled to increase the overall integrity and tear resistance of the nonwoven mat. While other methods for further entangling the spunbond fibers 22 of the nonwoven mat 84 could be used, a typical method for further entangling the generally continuous spunbond fibers 22 of the nonwoven mat 84 is to subject the nonwoven mat to a needle punching operation in the fiber entangling station 54. In the needle punching operation rows of barbed needles extending across the width of the nonwoven mat 84 are passed back and forth through the thickness of the nonwoven mat to engage and further entangle together the generally continuous spunbond fibers 22 of the nonwoven mat.

The nonwoven mat 84 is preheated in the mat preheating station 56 and passed through the thermal bonding station 58 where heat and compressive pressure are applied to the nonwoven mat 84 by calendar rolls 86 to bond the spunbond fibers 22 of the nonwoven mat 84 together at their points of intersection. In the mat preheating station 56, at least a portion of the polymeric material of the generally continuous spunbond fibers 22 of the nonwoven mat 84, extending from the outer surfaces of the fibers inward, is preheated to a temperature such that when the fibers of the nonwoven mat 84 are pressed together at their points of intersection by the calendar rolls 86, there is a sufficient amount of the polymeric material of the fibers 22 above the softening point temperature of the polymeric material of the fibers to form a strong bond between the fibers 22 at their points of intersection.

Where the generally continuous spunbond fibers 22 are sheathed spunbond fibers, the second polymeric material of the fiber sheaths is heated above its softening point temperature and the first polymeric material of the fiber cores remains below its softening point temperature. If the generally continuous spunbond fibers 22 of the nonwoven mat 84 are not preheated in the mat preheating station 56, but only heated as the fibers 22 pass between the heated calendar rolls 86 of the bonding station 58, the bond formed between the fibers 22 has less integrity and the nonwoven mat may be more easily delaminated.

Where the generally continuous spunbond fibers 22 are sheathed spunbond fibers, the polymeric material of the fiber sheaths not only bonds the fibers together at their points of intersection but as the fibers are compressed between the calendar rolls 86 in the bonding station 58, a portion of the polymeric material of the fiber sheaths, heated above its softening point temperature, is dispersed or flows into the interstices of the nonwoven mat 84 to at least partially fill the interstices of the nonwoven mat 84 and reduce the porosity of the nonwoven mat. The flow or dispersion of the polymeric material of the fiber sheaths into the interstices of the nonwoven mat 84 is controlled to provide the nonwoven mat with a desired porosity or to eliminate or substantially eliminate the mat's porosity. By keeping the temperature of cores of the sheathed spunbond fibers 22 below the softening point temperature of the polymeric material of the fiber cores, the generally continuous spunbond fibers 22 better retain their integrity and the integrity of the nonwoven mat during and after this process step.

The mat preheating station 56 may be a conventional oven or other conventional heat source for preheating the nonwoven mat 84. The compressive calendaring pressure typically applied to the nonwoven mat 84 by the calendar rolls 86 is typically between 25 and 50 Bar and, for a nonwoven mat 84 of generally continuous polyester spunbond fibers, the calendar rolls 86 typically operate at a temperature of about 150° C. for the upper roll and about 220° C. for the lower roll. Where the spunbond fibers 22 are sheathed spunbond fibers, the upper and lower calendar rolls 86 can be operated at different surface speeds relative to each other and/or the speed of the nonwoven mat 84 through the calendar to facilitate the spreading and flow of the molten polymeric material of the fiber sheaths into the interstices of the nonwoven mat 84.

A nonwoven mat 84 that is removed from the process line 50 after passing through the thermal bonding station 58, which does not include a reinforcement 26, forms the nonwoven mat 20 of FIG. 1. A nonwoven mat 84 that is removed from the process line after passing through the thermal bonding station 58, which includes a reinforcement 26, forms the nonwoven mat 24 of FIG. 2.

Where a hydrophobic binder coating material 30 is applied to the polymeric fibers 22 forming the top major surface of a nonwoven mat 84, the nonwoven mat is passed through the first coating material applicator station 60. In the coating material applicator station 60, a hydrophobic binder coating material 30, such as but not limited to an acrylic binder material, is applied to the polymeric fibers forming one of the major surfaces of the nonwoven mat 84 and is typically in amounts between 13% and 41% by weight of the nonwoven mat/coating material composite thus formed. The hydrophobic binder coating material 30 may be spray applied, roller applied, or otherwise applied to the polymeric fibers 22 on the major surface by conventional coating techniques. However, a preferred method for applying the hydrophobic binder coating material 30 is with an "inking roll" that applies a very thin layer of the coating material. Preferably, the surface speed of the "inking roll" is less than the line speed of the mat 84 so that the relative speeds between the inking roll and the major surface of the mat 84 causes the coating material forming the coating layer 30 of the composite to be back coated, ironed, and spread over the entire major surface of the mat 84 to form a coating with a relatively smooth surface that, for the low coating weights used, better bridges and closes interstices or voids in the mat 84 to reduce the porosity of the mat. The hydrophobic binder coating material 30 coating the fibers is then dried, heated and cured in the first curing station 62, which typically employs a conventional oven to dry, heat, and cure the coating material.

A nonwoven mat 84 that is removed from the process line 50 after passing through the first coating application and curing stations 60 and 62, which does not include a reinforcement 26, forms the nonwoven mat composite 28 of FIG. 3. A nonwoven mat 84 that is removed from the process line 50 after passing through the first coating and curing stations 60 and 62, which includes a reinforcement 26, forms the nonwoven mat composite 32 of FIG. 4. The application of a hydrophobic binder coating material 30 to the fibers 22 on the upper major surfaces of these nonwoven mats 28 and 32 makes these mats and the underlayments made from these mats more water transmission resistant.

To form the nonwoven mats 36 and 38 of FIGS. 5 and 6, no hydrophobic binder coating material 30 is applied to the fibers in the first coating application station 60 and a water repellant coating material 34 is applied to top and/or bottom major surfaces of the nonwoven mat 84 in the second coating application station 64. The water repellant coating material 34 is then dried, heated and cured in the second curing station 66, which typically employs a conventional oven to dry, heat, and cure the coating material, and wound up in a roll in the windup station 68. The coating material 34 may be spray applied, roller applied, dip saturation applied, slot die extruded onto, or otherwise applied to one or both major surfaces of the nonwoven mat 84 in the second coating application station 64 by conventional coating techniques. However, a preferred method for applying the coating layer 34 is with an "inking roll" that applies a very thin layer of the coating material. Preferably, the surface speed of the "inking roll" is less than the line speed of the mat 84 so that the relative speeds between the inking roll and the major surface of the mat 84 causes the coating material forming the coating layer 34 of the composite to be back coated, ironed, and spread over the entire major surface of the mat being coated to form a coating with a relatively smooth surface that, for the low coating weights used, better bridges and closes voids in the mat 84 to reduce the porosity of the mat.

To form the nonwoven mats 40 and 42 of FIGS. 7 and 8, a hydrophobic binder coating material 30 is applied to the fibers 22 on the top major surface on the nonwoven mat 84 in the first coating application station 60. The hydrophobic binder coating material 30 is dried, heated and cured in the first coating curing station 62. With the hydrophobic binder coating material 30 dried, a water repellant coating material 34 is applied to top and/or bottom major surfaces of the nonwoven mat 84 in the second coating application station 64. The water repellant coating layer 34 is then dried, heated and cured in the second curing station 66, which typically employs a conventional oven to dry, heat, and cure the coating material, and wound up in a roll in the windup station 68. The coating material 34 may be spray applied, roller applied, dip saturation applied, slot die extruded onto, or otherwise applied to the major surface(s) of the nonwoven mat 84 in the second coating application station 64 by conventional coating techniques. However, a preferred method for applying the coating material 34 is with an "inking roll" that applies a very thin layer of the coating material. Preferably, the surface speed of the "inking roll" is less than the line speed of the mat 84 so that the relative speeds between the inking roll and the major surface of the mat 84 causes the coating material forming the coating layer 34 of the composite to be back coated, ironed, and spread over the entire major surface of the mat 84 to form a coating with a relatively smooth surface that, for the low coating weights used, better bridges and closes voids in the mat 84.

Where it is desired to coat any of the nonwoven mats or mat composites of the subject invention with additional coating materials, such as but not limited to a self-adhering layer on the bottom major surface of the mat, etc., additional coating and release sheet or other process stations can be included in the production line 50 downstream of the oven 66 and prior to the windup 68.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A prefabricated building construction underlayment roll good, comprising:
    a flexible nonwoven mat of polymeric fibers; the nonwoven mat having a length, a width, and a thickness, the nonwoven mat having a top major surface and a bottom major surface that are each defined by the length and the width of the nonwoven mat; the polymeric fibers being substantially uniformly dispersed throughout the nonwoven mat; the polymeric fibers being generally continuous spunbond polyester fibers that have inner fiber cores and outer fiber sheaths; the fiber cores being of a first polyester material and the fiber sheaths being of a second polyester material; the second polyester material of the fiber sheaths having a lower temperature softening point than a softening point temperature of the first polyester material of the fiber cores; the polymeric fibers being bonded together at their points of intersection by the second polyester material of the fiber sheaths; and interstices of the nonwoven mat being at least partially filled by a portion of the second polyester material of the fiber sheaths that has been dispersed into the interstices to reduce the porosity of the nonwoven mat; wherein the polymeric fibers of the nonwoven mat are further entangled after the nonwoven mat has been initially formed to provide the nonwoven mat with a greater resistance to delamination;
    a reinforcement contained in the nonwoven mat;
    a hydrophobic binder coating layer overlying the polymeric fibers of the nonwoven mat on the top major surface of the nonwoven mat and being substantially coextensive with the top major surface of the nonwoven mat; the hydrophobic binder coating layer further closing interstices of the nonwoven mat to form a flexible liquid water transmission resistant nonwoven mat composite that is more water transmission resistant than the flexible nonwoven mat; and
    a filled asphalt, modified bitumen, or non-asphaltic polymeric film overlying and substantially coextensive with the hydrophobic binder coating layer to form a flexible waterproof nonwoven mat composite.

2. The prefabricated building construction underlayment roll good according to claim 1, wherein:
    the bottom major surface of the roll good is formed by the bottom major surface of the nonwoven mat.

3. The prefabricated building construction underlayment roll good according to claim 1, wherein:
    the film overlying the hydrophobic binder coating layer is the filled asphalt or the modified bitumen.

4. The prefabricated building construction underlayment roll good according to claim 3, wherein:
    the underlayment roll good weighs about 12.5 pounds per 100 square feet or less.

5. The prefabricated building construction underlayment roll good according to claim 1, wherein:
    the film overlying the hydrophobic binder coating layer is selected from a group of films consisting of polypropylene film, polyethylene film, polypropylene or polyethylene film coextruded with an exposed ethylene vinyl acetate film, nylon film, and polypropylene/polyethylene blended with ethylene vinyl acetate or polyvinyl chloride film.

6. The prefabricated building construction underlayment roll good according to claim 5, wherein:
    the underlayment roll good weighs 10 pounds per 100 square feet or less.

7. The prefabricated building construction underlayment roll good according to claim 1, wherein:
    the polyester fibers are between 60% and 95% by weight the first polymeric material of the fiber cores and between 5% and 40% by weight the second polymeric material of the fiber sheaths.

8. The prefabricated building construction underlayment roll good according to claim 1, wherein:
    the nonwoven mat composite has a water vapor transmission rate of about 0.1 perms or greater.

9. The prefabricated building construction underlayment roll good according to claim 1, wherein:
    a top major surface of the underlayment is textured to make the top major surface slip-resistant.

10. The prefabricated building construction underlayment roll good according to claim 1, wherein:
    a top major surface of the underlayment includes a gritty material to make the top major surface slip-resistant.

11. The prefabricated building construction underlayment roll good according to claim 10, wherein:
    the gritty material is selected from a group consisting of sand, coal slag, pulverized tire scrap, rubber particles, plastic particles, and mixtures thereof.

12. The prefabricated building construction underlayment roll good according to claim 1, wherein:
    a self-adhering layer overlies, is bonded to, and is substantially coextensive with the bottom major surface of the nonwoven mat; and
    a release sheet overlies, is releasably bonded to, and is substantially coextensive with a bottom major surface of the self-adhering layer.

13. The prefabricated building construction underlayment roll good according to claim 12, wherein:
    an exposed major surface of the filled asphalt, modified bitumen, or non-asphaltic polymeric film includes a gritty material to make the top major surface of the film slip-resistant.

14. The prefabricated building construction underlayment roll good according to claim 13, wherein:
    the gritty material is selected from a group consisting of sand, coal slag, pulverized tire scrap, rubber particles, plastic particles, and mixtures thereof.

15. The prefabricated building construction underlayment roll good according to claim 12, wherein:
    an exposed major surface of the filled asphalt, modified bitumen, or non-asphaltic polymeric film is textured to make the top major surface of the film slip-resistant.

* * * * *